United States Patent [19]
Dyson

[11] 3,779,780
[45] Dec. 18, 1973

[54] WRITING INK CONTAINING NONANOIC ACID

[75] Inventor: John J. Dyson, Janesville, Wis.

[73] Assignee: The Parker Pen Company, Janesville, Wis.

[22] Filed: June 7, 1971

[21] Appl. No.: 150,783

[52] U.S. Cl. ............... 106/27, 106/243, 106/308 F
[51] Int. Cl.. C09d 11/00, C09d 11/02, C09d 11/16
[58] Field of Search ............. 106/19–32, 243, 308 F

[56] References Cited
UNITED STATES PATENTS

| | | | |
|---|---|---|---|
| 3,705,043 | 2/1972 | Zabiak | 106/20 |
| 2,684,909 | 7/1954 | Leekley et al. | 106/24 |
| 2,690,973 | 10/1954 | Voet | 106/30 X |
| 3,468,679 | 9/1969 | Furlotti | 106/22 |
| 3,486,912 | 12/1969 | Dyson | 106/22 |
| 3,519,443 | 7/1970 | Kaplan et al. | 106/22 |

FOREIGN PATENTS OR APPLICATIONS

| | | | |
|---|---|---|---|
| 1,064,663 | 9/1959 | Germany | 106/22 |

*Primary Examiner*—Joseph L. Schofer
*Assistant Examiner*—J. B. Evans
*Attorney*—Fidler, Patnaude, Lazo & Batz

[57] ABSTRACT

A thin writing ink having a viscosity not exceeding 50 centipoises at 25° C. comprising a dispersion of a pigment in a molecular associated liquid vehicle wherein the total solids in said ink are between about 0.05% and 35% by weight.

7 Claims, No Drawings

WRITING INK CONTAINING NONANOIC ACID

This invention relates to writing inks and more particularly to low viscosity writing inks that include a dispersed pigment as a coloring agent.

In the past, water has served as the vehicle in some inks that utilize either a dispersed pigment or a water soluble dye to provide the color. These inks have a disadvantage in that they dry rapidly on the nib and in the feed mechanism of a conventional pen or in the pores of a felt writer, tending to plug the writing tip and to prevent further passage of the ink.

To avoid some of the disadvantages of aqueous inks, organic vehicles have been used with pigments and with dyes. These inks generally do not dry by evaporation as rapidly as aqueous inks but have another disadvantage in that they cause staining and strike-through onto the back of the web because they have too high a paper penetrating ability.

It is known that a molecular associated liquid such as formamide can be used as the principal vehicle for dyes to provide a rapid-drying and relatively nonevaporating and nonpenetrating ink. These inks have proved to be satisfactory but have a disadvantage in that the ink is drawn from an exposed pen point into cloth to a larger degree than desirable. Because of this disadvantage, there is some danger that ink will be drawn from a pen carried in a pocket and stain a garment. In addition, such inks often exhibit a high degree of feathering and a low nibbability factor. Feathering is the creation of a rough edge on a line. Thus, low feathering is a characteristic of inks that is continually sought. Nibbability is a measure of the rate of flow of the ink in a given writing system and is obtained by dividing the metered flow rate of the ink by the negative static fluid pressure at the writing surface when the ink line will dry to a non-blocking condition in a given time. Such static pressure tends to hold back the ink within the reservoir. High absolute values for nibbability is generally desirable in writing inks for nib pens.

Accordingly, it is an object of this invention to provide an improved thin writing ink.

It is a further object of this invention to provide a fast drying, low viscosity ink having low feathering and good nibbability, that is not easily drawn from the exposed point of a writing instrument by cloth.

It is a still further object of this invention to provide a fast drying, low viscosity writing ink that is not easily drawn from the exposed point of a writing instrument by cloth.

In accordance with the above and further objects of the invention, a rapid drying, low viscosity ink comprises a pigment dispersed in a molecular associated liquid vehicle wherein the total solids in said ink are between about 0.05% and 35% by weight, said ink having a viscosity not exceeding 50 centipoises at 25° C. In accordance with this invention the liquid vehicle can be I. a molecular associated liquid selected from the class consisting of:
  a. glycols selected from the class consisting of ethylene glycol, diethylene glycol, triethylene glycol, hexylene glycol and mixtures thereof;
  b. cyclic compounds selected from the class consisting of butyrolactone, methyl pyrrolidone, 2-pyrrolidone and mixtures thereof;
  c. propylene carbonate;
  d. N-2-hydroxyethylformamide; and
  e. mixtures of (a), (b), (c) and (d) liquids;

II. a mixture containing by weight 65–99.9 percent of said molecular associated liquid, 0–5 percent of nonanoic acid and 0–30 percent of water; or III. a mixture containing by weight 65–97 percent of formamide, 0–5 percent of nonanoic acid and 0–30 percent of water.

All of the fluids listed are completely miscible in any combination with two exceptions, namely water, which will not mix with nonanoic acid and will not mix with propylene carbonate containing up to 5% nonanoic acid. When used with the other fluids propylene carbonate will tolerate water up to 30% of the fluid weight.

Such an ink including a low vapor-pressure molecular associated liquid as a vehicle for a dispersion of pigment has several advantages. First, the ink is not drawn easily from an exposed pen point into the cloth of a pocket because the pigments form a dam around the edge of the pen to hold the ink in the point when it is stationary. However, when the pen is writing, these pigment dams are broken by the motion of the pen so that the ink flows freely. Another advantage is that there is a reduced feathering of lines drawn with this ink. It is believed that the dispersion of pigments forms preferential associations with the sizing of the paper along the edges of the line to prevent the ink at these points from reaching the web.

Still another advantage is that the ink of the present invention has a greater nibbability. The reasons for this advantage when a dispersion of pigments is used with a low vapor-pressure molecular associated liquid as a vehicle are not known although it is known that the nibbability is related to the viscosity and surface tension relationships and that these relationships are affected by hydrogen bonding and molecular weight considerations.

DESCRIPTION OF THE VEHICLE

As used herein, a low vapor-pressure liquid is a liquid having a vapor pressure substantially lower than that of water, such as between 0 and 40 millimeters of mercury at 70° C.

More specifically, molecular associated liquids such as those used as the vehicle in the invention comprise molecules in which an atom of hydrogen is attracted by strong forces to two atoms, instead of to only one atom so that it may be considered to be acting as a bond between the two atoms. Accordingly, molecular associated liquids are those which contain relatively complex molecular species formed by the linking together of a relatively large, but indefinite, number of single molecules by hydrogen bonds.

The vehicle, besides being a molecular associated liquid, is a liquid having a vapor pressure substantially lower than that of water. Vehicles having vapor pressures within the range of from 0 millimeters of mercury to 40 millimeters of mercury at 70° C. are suitable.

Suitable vehicles in accordance with this invention are ethylene glycol, diethylene glycol, triethylene glycol, hexylene glycol, butyrolactone, N-methyl-2-pyrrolidone, 2-pyrrolidone, propylene carbonate, N-2-hydroxyethylformamide and mixtures of these. Mixtures of one or more of the above liquids with up to 5% nonanoic acid and/or up to 30% water, based upon the total weight of the mixed liquids can also be employed. Another suitable vehicle is a mixture containing 65–97 percent formamide 0–5 percent nonanoic acid and 0–30 percent water.

DESCRIPTION OF THE PIGMENT

Broadly, any of the commonly available pigments, both inorganic and organic including natural as well as synthetic chemical substances, can be used to form the pigment dispersions of the improved ink of the present invention. Such pigments, however, must be insoluble in the vehicle. Suitable pigments include:

Reds
    Inorganic
        iron oxide reds
        cadmium reds
        English vermilion
        copper ferrocyanide
        red lead
    Organic
        toluidine red
        para red
        chlorinated para red
        lithol red Oranges
    Inorganic
        chrome orange
        molybdate orange
        orange mineral
    Organic
        ortho-nitraniline orange
        dinitraniline orange
        orange lakes Yellows
    Inorganic
        chrome yellows
        zinc yellow
        cadmium yellow
    Organic
        Hansa yellow
        nickel azo yellow
        yellow lakes Greens
    Inorganic
        chrome green
        chrome oxide green
    Organic
        phosphotungstic green
        phosphomolybdic green
        phthalocyanine green Blues
    Inorganic
        iron blues
        ultramarine blue
    Organic
        indanthrone blue
        phthalocyanine blue Black
    Inorganic
        carbon black
        lamp black
        manganese dioxide
        black iron oxide
        molybdenum sulfide
    Organic
        Logwood black
        Nigrosine black White
    Inorganic
        white lead
        zinc oxide
        antimony trioxide
        titanium dioxide Metallic
    Inorganic
        aluminum
        copper
        bronze
        gold
        magnetic flux particles In addition, the water insoluble organic dyes known as pigment colors can be employed. Other suitable pigments are sold under the name of Pigment Fast Blue B Pigmosol, Pigment Fast Green GN Pigmosol, Carbon Black 3 Pigmosol, Lithol Fast Scarlet BBN Pigmosol, and Lithol Fast Yellow NCR Pigmosol. These pigments are manufactured and sold by Badische Anilin & Soda — Fabrik A.G. (BASF Color & Chemical Company) of Paramus, New Jersey 07652. Fluorescent and phosphorescent pigments can also be employed. Suitable examples are Helicon phosphorescent Color No. 2480 manufactured by United States Radium Corporation and T-13 Rocket Red and 0-17 Saturn Yellow, manufactured by Schutze Brothers Day Glo Division, Cleveland, Ohio. It is understood that various mixtures of any of the pigments listed above can be utilized in the inks of the present invention. In addition, any of the above pigments can be mixed with colorless pigments such as silicon dioxide or aluminum oxide where desired. The silicon dioxide and aluminum oxide may be either naturally hydrophilic or suitably treated to make them hydrophobic.

Approximately 35% by weight of the pigment tends to be the maximum upper limit for use in the inks. Above this upper limit, the ink solution is generally too viscous for use in instruments designed to dispense true fluids. However, it is possible to use the ink in a ball point pen. Accordingly, the inks of the present invention comprise in the range of 65-99.95 percent by weight of the molecular associated liquid or solution and in the range of 0.05-35 percent by weight of the pigment.

The draftman's ruling pen is a practical device for determining a preferred upper limit for the pigment concentration. In such pens, the nib acts as its own capillary reservoir and flow problems at the upper limits of viscosities are generally reduced because of the nib's simple nature. Using this test, approximately 0.05-35 percent by weight of pigment appears to represent the preferred range for the molecular associated liquid based ink. Above this composition, the ink is generally too viscous to be delivered freely from the nib.

In conventional fountain pen nibs, with the complexities of reservoir and feed systems to be faced, much lower viscosities are used. For such inks, the optimum viscosities occur at total solids contents below 15 percent and might be reduced to as low as 4% or even 1% by weight in some cases.

ADDITIVES

If desired, one can optionally use in the basic ink formulation conventional additives such as evaporation inhibitors, polysited hydrogen bonding molecules, diluents, hygroscopic agents, thixotropy improvers, surfactants, stabilizers and the like which can be added to improve specific properties of the ink such as paper penetrating ability, evaporation rate, surface tension, viscosity, feather control, damming effect, solvent to pigment association and cloth exclusion. These additives may be added to the vehicle or the pigment prior to mixing.

While molecular-associated liquids having a pigment as the coloring agent do not penetrate sized webs to any appreciable extent, it has also been found that the paper penetrating ability of such liquids can be decreased still further by including polysited hydrogen bonding molecules in the ink. The evaporation rate or drying rate of the molecular-associated liquid based inks can be controlled further through the use of minor amounts of essentially non-evaporating additives which promote delivery of ink from the end of a nib with properly starved lines having flat cross-sectional shapes because delivery is dominated by surface tension. The importance of non-evaporating additives results from the relationship that exists between surface tension and viscosity of the vehicle. If the surface tension is stronger than the viscosity, so that the surface tension dominates the flow properties of the vehicle, less ink is delivered from a nib to the paper during writing. Less evaporation to reach dryness is required as a result of the lesser quantity of ink and a wider choice of liquids may be had by virtue of the control on the line volume obtained.

If it becomes necessary to dilute the ink composition, for example to reduce the viscosity, it is desirable to reduce the surface tension as little as possible. This is best accomplished by selecting the diluent according to these principles of hydrogen bonding and keeping their molecules as small and as heavy as possible.

One of the important features offered by an ink that includes a pigment dispersed in a molecular-associated liquid is a new convenience in writing. This goal is met by the production of essentially non-volatile liquids that do not evaporate as quickly as water and therefore do not dry in ink pens. On the other hand, they do dry rapidly by penetrating into paper.

To assist in the prevention of ink dry-up on the point of a pen, which can cause plugging or poor start-up, a hygroscopic agent can be added to the ink solution. Through the use of these materials, the point of the pen tends to stay moist, ready for instant writing, even if left uncovered for a considerable length of time.

The concentration of additive or additives in the finished molecular associated liquid-base inks is not critical. Different concentrations of additives can be employed depending upon the properties of the ink desired and its intended use. In general, a minor but specific property-improving amount of each is utilized. Specific concentrations can vary in the range of about 0.5 to 34 percent by weight of the total weight of the ink.

Inks prepared as described above have been found to be substantially non-evaporating, properly penetrating, of relatively high surface tension, of low viscosity and capable of producing sharply defined markings on a web.

EXAMPLES

The following examples are representative of different embodiments of the ink of the present invention:

EXAMPLE I

Basic formulas comprising a pigment in a glycol vehicle can be prepared by adding pigment and grinding the mixture to form a dispersion of the pigment in the liquid. Generally, if the additives are employed, they are dissolved in the glycol prior to the addition of the pigment and its agitation.

(A)
| | grams |
|---|---|
| Ethylene glycol | 60 |
| Pigmosol Blue B | 8 |

(B)
| | |
|---|---|
| Ethylene glycol | 42 |
| Water | 8 |
| Pigmosol Blue B | 8 |

(C)
| | |
|---|---|
| Ethylene glycol | 57 |
| Nonanoic acid | 3 |
| Pigmosol Blue B | 8 |

(D)
| | |
|---|---|
| Ethylene glycol | 32.5 |
| Nonanoic acid | 2.5 |
| Water | 15 |
| Pigmosol Blue B | 8 |

(E)
| | |
|---|---|
| Hexylene glycol | 57 |
| Nonanoic acid | 3 |
| Pigmosol Blue B | 8 |

(F)
| | |
|---|---|
| Hexylene glycol | 42 |
| Water | 8 |
| Pigmosol Blue B | 8 |

(G)
| | |
|---|---|
| Hexylene glycol | 32.5 |
| Nonanoic acid | 2.5 |
| Water | 15 |
| Pigmosol Blue B | 8 |

Pigmosol Blue B is a phthalocyanine pigment made by BASF.

EXAMPLE 2

An example of a black writing ink consisting essentially of a pigment dispersed in aqueous formamide has the following composition:

| | |
|---|---|
| Formamide | 60 g. |
| Water | 6 g. |
| Pigmosol Carbon Black 3 (BASF) | 8 g. |

Additional examples illustrating the principles of the present invention are given below as examples 3 – 16.

EXAMPLE 3

| | |
|---|---|
| Pigment Red 7 (CI 12420) | 8 g. |
| Hexylene glycol | 60 g. |
| Blancol Conc. G. | 0.1 g. |

Pigment Red 7 is an organic pigment. Blancol Concentrate Powder G. is a dispersing agent manufactured by General Analine and Film, Division of Allied Chemical & Dye Company. It is the sodium salt of sulfonated naphthaleneformaldehyde condensate and has the formula, sodium 2,2' dinaphthylmethane 6,6' disulfonate.

EXAMPLE 4

| | |
|---|---|
| No. R-2082 black No. 1 (Logwood black manufactured by the Capitol Color and Chemical Co. | 8 g. |
| Ethylene glycol | 30 g. |
| Blancol Conc. G. | 0.1 g. |

EXAMPLE 5

| | |
|---|---|
| No. R-2082 black No. 1 | 8 g. |
| Ethylene glycol | 21 g. |
| Water | 9 g. |
| Butyrolactone | 30 g. |
| Blancol Conc. G. | 0.1 g. |

EXAMPLE 6

| | |
|---|---|
| No. R-2082 black No. 1 | 8 g. |
| Ethylene glycol | 21 g. |
| Water | 9 g. |
| Butyrolactone | 27 g. |
| Nonanoic acid | 3 g. |
| Blancol Conc. G. | 0.1 g. |

EXAMPLE 7

| | |
|---|---|
| Silica pigment (Degussa uncompressed fine-colorless-pigment) | 0.1 g. |
| Acid blue 24 soluble dyestuff | 1.0 g. |
| Ethylene glycol | 50 g. |

EXAMPLE 8

An example of an ethylene glycol ink including anhydrous deliquescent agent is as follows:

| | |
|---|---|
| Ethylene glycol | 100 g. |
| Pigment Fast Green GN Pigmosol | 10 g. |
| Lithium chloride (Anhydrous) | 1.5 g. |

EXAMPLE 9

An example of an ethylene glycol ink including a non-evaporating additive is as follows:

| | |
|---|---|
| Ethylene glycol | 66 g. |
| Carbon Black 3 Pigmosol | 6 g. |
| Polyethylene glycol No.200 (ave. mol. wt. 646) | 5.25 g. |

EXAMPLE 10

A second example of an ethylene glycol ink including a non-evaporating solvent additive follows. In this example, hydroxyethyl formamide is particularly desirable in that it does not materially affect surface tension:

| | |
|---|---|
| Ethylene glycol | 66 g. |
| Pigment Fast Scarlet BBN Pigmosol | 6 g. |
| Hydroxyethyl formamide | 11.1 g. |

EXAMPLE 11

An example of an ethylene glycol ink including a non-evaporating additive and a deliquescent additive follows:

| | |
|---|---|
| Ethylene glycol | 66 g. |
| Lithol Fast Yellow NCR Pigmosol | 6 g. |
| Polyethylene glycol No. 200 (ave. mol. wt. 646) | 5.25 g. |
| Lithium chloride (Anhydrous) | 3.15 g. |

EXAMPLE 12

An example of an ethylene glycol ink including a non-evaporating additive and a deliquescent additive that is controlled by water addition follows:

| | |
|---|---|
| Ethylene glycol | 66 g. |
| Pigmosol Blue B | 6 g. |
| Polyethylene glycol No. 200 (ave. mol. wt. 646) | 5.25 g. |
| Water | 3 g. |
| Lithium chloride (Anhydrous) | 0.1 g. |

EXAMPLE 13

An example of an ethylene glycol ink that includes additional polysited hydrogen bonding molecule the normal hydrogen bonding solvent molecules of ethylene glycol and to improve their paper performance follows:

| | |
|---|---|
| Ethylene glycol | 66 g. |
| Pigmosol Blue B | 6 g. |
| Pentaerythritol | 0.4 g. |

EXAMPLE 14

An example of an ethylene glycol ink including pure sucrose as a hydrogen bonding agent having multiple sites follows. Here the sucrose is soluble in its pure, unesterified form, and acts as an H-bonding agent. The built-in di-functional hydrogen bonding effect of the ethylene glycol vehicle makes it a good solvent for the sucrose:

| | |
|---|---|
| Ethylene glycol | 66 g. |
| Pigmosol Blue B | 6 g. |
| Sucrose | 0.57 g. |

The above formulae were all made with BASF pigmosols, as indicated, and ball milled for approximately 24 hours, and tested. They were all tested successfully for feathering and transfer to paper during writing but were significantly non-transferable to washed and dried muslin.

EXAMPLE 15

| | |
|---|---|
| Pigmosol Blue B | 8 g. |
| propylene carbonate | 60 g. |

EXAMPLE 16

| | |
|---|---|
| Pigmosol Blue B | 8 g. |
| N-2-hydroxyethyl formamide | 60 g. |

COMPARISON OF THE SAMPLES

From the chart shown below it can be seen that the nibbability factor of the newer inks is greater than it is for water based inks or inks utilizing soluble dyes with a molecular associated liquid such as formamide. At the greater nibbability values more ink can be delivered with less negative pressure to obtain a standard 5-second dry time. More ink per unit line means more intense color and implies the ability to throttle back, if desired, and still have sufficient vehicle delivered to the line. This results in better cartridge life and a still faster line dry.

| Ink | Meter Rate g/hr | Weir (adjusted) Pressure cm/H$_2$O | Nibbability Factor |
|---|---|---|---|
| Water-based Super Quink | 0.9 | 0.51 | 1.75 |
| Formamide alone | 0.65 | 1.8 | 0.362 |
| Colanyl pigment in formamide | 1.00 | 0.5 | 2.00 |
| Soluble dye plus formamide | 0.56 | 1.0 | 0.56 |
| Colanyl pigment in formamide and 10% water | 1.3 | 0.5 | 2.60 |

Colanyl pigment is Pigmosol Blue B dispersed in ethylene glycol as a thick paste.

It is to be understood that the compositions presented in the above examples are in no way limiting, the invention being limited only by the scope of the following claims:

What is claimed is:

1. A writing ink having a viscosity between about 3 to 50 centipoises at 25° C. comprising in the range of from about 0.05 to 30 percent by weight of a pigment dispersed in a liquid vehicle which is a mixture of a small amount but not more than 5 percent by weight of nonanoic acid, and 65 to 99.9 percent by weight of a liquid selected from the class consisting of:
   I. Formamide and
   II. A molecular associated liquid selected from the class consisting of
      a. Glycols selected from the class consisting of ethylene glycol, diethylene glycol, triethylene glycol, hexylene glycol and mixtures thereof;
      b. Cyclic compounds selected from the class consisting of butyrolactone, methyl pyrrolidone, 2-pyrrolidone and mixtures thereof;
      c. Propylene carbonate;
      d. N-2-hyroxyethylformamide; and
      e. Mixtures of (a), (b), (c) and (d) liquids.

2. A writing ink as set forth in claim 1 wherein said liquid vehicle contains water in a small amount but not more than 30 percent by weight of said liquid vehicle.

3. A writing ink as set forth in claim 1 in which said liquid vehicle is essentially formamide.

4. A writing ink as set forth in claim 1 in which said liquid vehicle is essentially ethylene glycol.

5. A writing ink as set forth in claim 1 wherein said pigment is a metal organic complex pigment.

6. A writing ink having a viscosity between about 3–50 centipoises at 25° C. comprising in the range of from about 0.05 to 35 percent by weight of a pigment dispersed in a liquid vehicle which is a mixture of a small amount but not more than 5 percent by weight of nonanoic acid, 0–30 percent by weight of water and 65–99.9 percent by weight of a molecular associated liquid selected from the class consisting of:
   a. glycols selected from the class consisting of ethylene glycol, diethylene glycol, triethylene glycol, hexylene glycol and mixtures thereof;
   b. cyclic compounds selected from the class consisting of butyrolactone, methyl pyrrolidone, 2-pyrrolidone and mixtures thereof;
   c. propylene carbonate;
   d. N-2-hydroxyethylformamide; and
   e. mixtures of (a), (b), (c) and (d) liquids; said pigment being insoluble in said vehicle.

7. A writing ink having a viscosity between about 3–50 centipoises at 25° C. comprising in the range of from about 0.05 to 35 percent by weight of a pigment dispersed in a liquid vehicle which is a mixture containing by weight about 65–99.9 percent of formamide, nonanoic acid in a small amount but not more than 5 percent by weight of said mixture and water in a small amount but not more than 30 percent by weight of said mixture, said pigment being insoluble in said liquid vehicle.

* * * * *